US 6,667,824 B2

(12) United States Patent
Bayart et al.

(10) Patent No.: US 6,667,824 B2
(45) Date of Patent: Dec. 23, 2003

(54) DYNAMIC SPATIAL EQUALIZER BASED ON A SPATIAL LIGHT MODULATOR

(75) Inventors: Dominique Bayart, Clamart (FR); Jean-Louis De Bougrenet De La Tocnaye, Saint-Renan (FR); Raymond Chevallier, Plougonvelin (FR); Laurent Dupont, Plouzané (FR)

(73) Assignee: Alcatel, Paris (FR)

( * ) Notice: Subject to any disclaimer, the term of this patent is extended or adjusted under 35 U.S.C. 154(b) by 39 days.

(21) Appl. No.: 09/988,377

(22) Filed: Nov. 19, 2001

(65) Prior Publication Data

US 2002/0080466 A1 Jun. 27, 2002

(30) Foreign Application Priority Data

Nov. 20, 2000 (EP) .............................................. 00440299

(51) Int. Cl.[7] .............................. G02F 1/03; G02F 1/07; G02F 1/135
(52) U.S. Cl. .......................... 359/254; 359/245; 349/25
(58) Field of Search ................................ 359/291, 292, 359/295, 321, 254, 296; 349/24, 25

(56) References Cited

U.S. PATENT DOCUMENTS

| 4,193,691 | A |   | 3/1980 | Fjarlie ......................... 356/330 |
| 4,277,145 | A | * | 7/1981 | Hareng et al. ................. 349/20 |
| 5,132,814 | A | * | 7/1992 | Ohkouchi et al. ............. 349/27 |
| 5,486,936 | A | * | 1/1996 | Fujikake et al. ............... 349/86 |
| 6,084,695 | A |   | 7/2000 | Martin et al. ................ 359/131 |
| 6,104,448 | A | * | 8/2000 | Doane et al. .................. 349/12 |
| 6,141,361 | A |   | 10/2000 | Mears et al. .................... 372/20 |

FOREIGN PATENT DOCUMENTS

| JP | 08304850 A | * | 11/1996 | ......... G02F/1/1333 |
| JP | 09080402 A | * | 3/1997 | ........... G02F/1/135 |
| WO | WO 98/06192 |   | 2/1998 | |

OTHER PUBLICATIONS

K. Takizawa et al, "Polarization–Independent Optical Fiber Modulator by Use of Polymer–Dispersed Liquid Crystals", Applied Optics, Optical Society of America, Washington, US, vol. 37, No. 15; May 20, 1998, pp. 3181–3189 XP000765274.

* cited by examiner

Primary Examiner—Ricky Mack
(74) Attorney, Agent, or Firm—Sughrue Mion, PLLC

(57) ABSTRACT

A spatial light modulator (SLM) is made up of a cell filled with a liquid crystal (LC) based substance. Latter has a variable scattering property with respect to an electric field present in the cell. By using a plurality of electrodes in the direct vicinity of said cell, it is then possible to build an electric field inside it which will permit advantageously to modulate a continuous spectrum from optical signals transmitted through said cell. The different pass bands present in said continuous spectrum while at least few of them comprise at least a respective different wavelength will have to be transmitted through said cell at different regions. Latter will correspond to different values of the amplitude of scattering such to be adapted to modulate the respective different pass bands. Such SLM is used to build a dynamic spectral equalizer. Latter contains a spectral dispersive element placed on an optical path of an incident light beam. This spectral dispersive element will spread continuously said incident light beam onto said SLM such that at least each different wavelength present in said incident light beam are focused or imaged towards a different spatial region of said SLM.

15 Claims, 4 Drawing Sheets

DYNAMIC SPATIAL EQUALIZER BASED ON A SPATIAL LIGHT MODULATOR

TECHNICAL FIELD

The present invention relates to a spatial light modulator, a dynamic spectral equalizer and a telecommunications device. The invention is based on a priority application EP 00 440 299.6 which is hereby incorporated by reference.

BACKGROUND OF THE INVENTION

Optical communication systems employing optical fibers have been rapidly put into practice because of the large capacity of information which can be transmitted through it at a very high speed. Specially for inter-continental transmission, optical fibers were used in building undersea networks already few decades ago. But the ever growing popularity of telecommunications e.g. on the Internet and a price dumping for telecommunications due to a liberalization of this economical sector end up of a need to increase substantially the telecommunications transmission possibilities without implying to high cost. The use of a technique called wavelength division multiplexing (WDM) shall be very promising since it permits to transmit in already lay down optical fibers, optical signals at multiple different wavelengths (more then 50 in a same optical fiber). As before, it is necessary to use from time to time (e.g. every 100 km depending on several parameters) amplifiers like transponders for those optical signals. Many amplifiers will have to be used now for a high number of different wavelengths. These amplifiers are then concatenated which harden the condition of an acceptable spectral bandwidth.

To verify such condition, a spectral equalization must be performed on the different transmitted wavelengths. When only few different wavelengths are used a passive spectral equalization may be sufficient. In U.S. Pat. No. 6,084,695 is disclosed an example of passive spectral equalization based on the use of a filter like a Fabry-Perot filter, little selective (or Fizeau filter). Such filter is used in combination of a multiplexer while different wavelengths are transmitted through different input fibers. Each of these input fibers have then their ends located on an end plane. The multiplexer comprises a dispersing element or grating, a collimating optical element, a reflector system and produces an output beam collected by an output fiber. The reflector system is an adjustment element whose orientation enables the centering of the luminous beams with respect to the wavelengths considered on the elementary pass bands. The spectral equalization is performed here in order to bring each of these pass bands having a maximum closer to a rectangular shape. The filter is additionally placed to act on each of them such that the period of its transmission spectrum is equal to that of the central wavelengths of the elementary bands of the multiplexer. This filter can be accommodated in a superimposition region of the different wavelengths and will act on each of them in a same way.

However, as wavelength division multiplexed optical transmission systems begin to be deployed commercially, the need for active management of spectral gain is increasingly important. Indeed, individual channel powers comprising at least a respective different wavelength may vary over time. Furthermore, the gain spectrum varies with dynamical load. In WO98/06192 is disclosed a technique for active management of the spectral gain, based on a polarization-insensitive diffractive ferroelectric liquid crystal (FLC) in-line filter. It is made of a reconfigurable holographic filter arranged along an optical path between the optical inputs and the optical outputs. The equalization is based here on a spatial deflection such that the hologram will reshape the propagated beam correspondingly. The holographic filter comprises a FLC pixellated spatial light modulator (SLM) displaying dynamic holograms in conjunction with a fixed binary-phase high spatial frequency grating. The reconfiguration of the holographic filter is achieved in combination with processing means storing data on a number of predetermined holograms. Latter provide signal power equalization for a number of optical signals of predetermined different wavelengths. The active management disclosed in WO98/06192 is limited to these predetermined holograms defined for predetermined wavelengths. It cannot be successfully applied when a shift or a change of few or all of the wavelengths occurs. But this is just what becomes increasingly important with the actual high number of different wavelengths used simultaneously for the transmission of optical signals under WDM.

SUMMARY OF THE INVENTION

It is an object of the present invention to provide a dynamic spectral equalizer with a high dispersive capacity and applicable for optical signals made of a variable number of different wavelengths while being almost polarization and temperature independent.

According to a first aspect of this invention, this object is attained by a spatial light modulator comprising a planar cell filled with a liquid crystal based substance having a variable scattering property with respect to an electric field, and at least two electrodes enclosing said planar cell from each side of its plane to apply a voltage on said liquid crystal, said applied voltage being non-uniform in space implying an electric field inside said cell with a variable spatial distribution along said plane adapted for the modulation of at least a pass band comprising at least a wavelength at which an optical signal is transmitted through said cell, while said modulation taking the form of a variable attenuation.

According to a second aspect of the invention, its object is achieved by a dynamic spectral equalizer comprising an optical input for an incident light beam consisting of optical signals transmitted via at least a wavelength, an optical output for collecting a resulting light beam, said dynamic spectral equalizer comprising further a spatial light modulator, in accordance with the first aspect of this invention.

Furthermore, its object is also achieved by a telecommunications device incorporating a dynamic spectral equalizer in accordance with the second aspect of the invention.

It is taken advantage of the use of a spatial light modulator (SLM) made of a cell filled with a liquid crystal (LC) based substance having a variable scattering property with respect to the amplitude of an electric field present in that cell. In a paper from K. Takizawa et al., Applied Optics, Vol. 37, pp 3181–3189, 1998, is disclosed a polarization independent optical fiber modulator made of polymer-dispersed liquid crystals (PDLC). This PDLC materials has LC droplets of several micrometers or less in diameter dispersed within the polymer. By controlling the difference between the refractive indices of the LC droplets and the surrounding polymer, the state of the PDLC can be varied continuously from opaque to transparent. When no electric field is applied to this modulator, the LC molecules face different directions for each droplet. An optical beam that is transmitted through said modulator, will be strongly scattered. This reduces substantially the power of light that propagates, causing the modulator to be in an off state. Applying an adequately large electric field to the PDLC causes the LC molecules to be arranged in the direction of the electric field. Then, both the polymer and the LC droplets show nearly the same refractive index. In this case, the optical beam that propagates through said modulator is straight without scatter. Since such modulator is based on the light-scattering effect of the PDLC, it can be used to modulate an optical beam without depending on polarization.

In the present invention it is now a non uniform electric field which is applied on a cell filled with a similar LC based substance. In such a way, it is then take advantage of the variable scattering property (loss) of said substance to build a variable attenuator. Latter will then be adapted for a shaping of the transmission loss of a pass band comprising at least a wavelength at which an optical signal is transmitted through said cell e.g. by flattening or equalizing said pass band. By using a plurality of electrodes in the direct vicinity of said cell, it is then possible to build an electric field inside it which will permit advantageously to modulate a continuous spectrum from optical signals transmitted through said cell. For that, the different pass bands present in said continuous spectrum while at least few of them comprise at least a respective different wavelength will have to be transmitted through said cell at different regions. Latter will correspond to different values of the amplitude of scattering such to be adapted to modulate the pass bands of different wavelengths.

Such SLM is favorably used to build a dynamic spectral equalizer according to the present invention. Latter contains a spectral dispersive element placed on an optical path of an incident light beam. This spectral dispersive element will advantageously spread continuously said incident light beam onto said SLM such that at least each different wavelength present in said incident light beam are focused or imaged towards a different spatial region of said SLM. Since the plurality of electrodes with which an electric field is applied to the cell of said SLM can be controlled independently, it will be possible to adopt in real time the modulation of the continuous spectrum to a shift or even a drop of some or addition of few new wavelengths present in the light beam.

Further advantageous features of the present invention are defined in the dependent claims and will become apparent from the following description and the drawing.

BRIEF DESCRIPTION OF THE DRAWINGS

One embodiment of the invention will now be explained in more detail with reference to the accompanying drawing, in which.

BEST MODE FOR CARRYING OUT THE INVENTION

Figure 4:
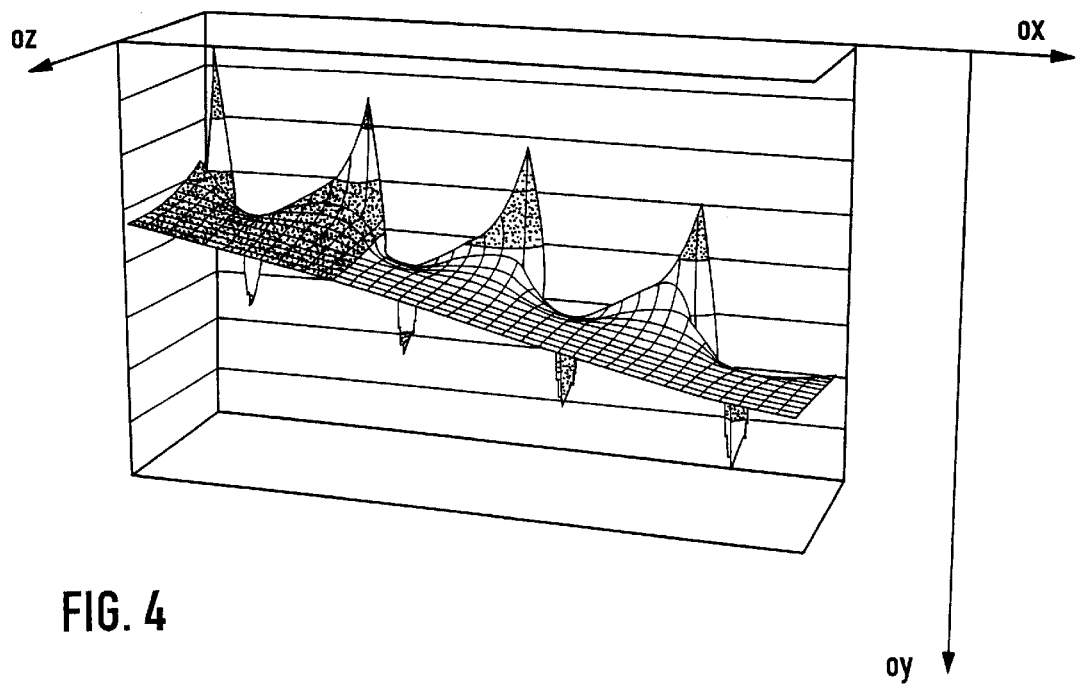
FIG. 4 is a perspective view of an electric field distribution inside the cell when using an electrode according to FIG. 3.

A spatial light modulator (SLM) according to the present invention is made up of a cell filled with a liquid crystal (LC) based substance. Latter has a variable scattering property with respect to an electric field present in the cell. As shown in FIGS. 1, 2 and 4, said LC based substance consists of LC droplets 3, 3a, 3b (generally nematic, but possibly chiral) in a host medium 4 (generally a polymer) confined in said cell 1 made advantageously planar. In the direct vicinity are placed electrodes 2. Latter are used to applied a non-uniform voltage which gives rise to said electric field inside the cell 1.

Figure 1A:
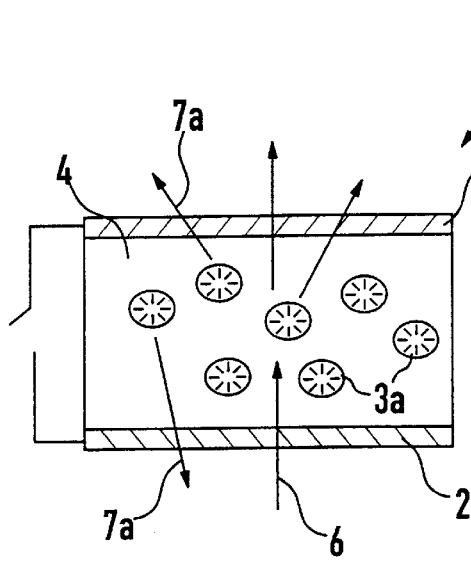
FIG. 1 a and b are schematic cross sectional views of a cell from a spatial light modulator according to the present invention.
Figure 1B:
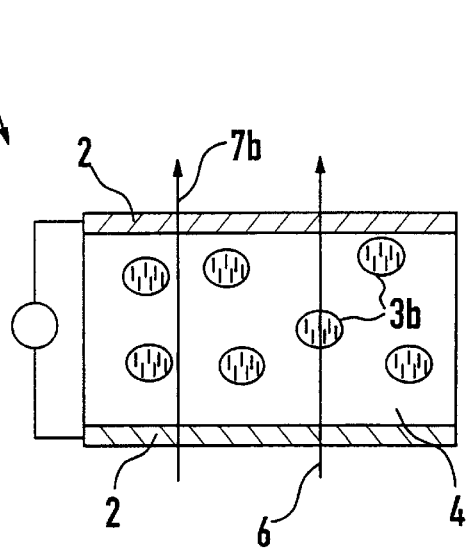

The LC director axes within a droplet are determined by the polymer-LC interaction at the droplet boundary. For positive dielectric anisotropy, then the LC director axes vary nearly randomly from droplet to droplet 3a in absence of any applied electric field as shown in FIG. 1a (off-field state). The index mismatch (discontinuity) between LC-droplets 3a and the host medium 4 results in scattering of an incident light 6. When the cell thickness (e.g. 10 $\mu$m) is much larger than the droplet size (0.5–1 $\mu$m), then the incident light 6 will be scattered many times before emerging 7a from the cell 1. The degree of scattering depends on the size, birefringence (e.g. 0.1 or less) and concentration of the droplets. By controlling the difference between refractive indices of the LC-droplets and the surrounding polymer (host medium 4) with respect of an applied voltage (see FIG. 1b), the polymer-dispersed LC (PDLC) state can be varied continuously from opaque to transparent. In latter case, the incident light 6 is transmitted 7b without suffering any scattering. It is therefore possible to modulate light without using polarisers, by selecting non-scattering rays 7b from the light that passes through said cell.

Figure 2A:
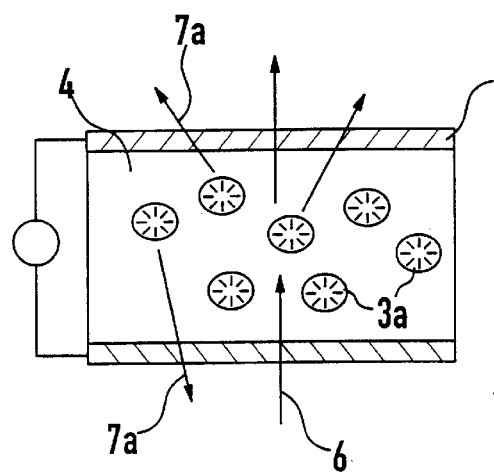
FIGS. 2 a and b are schematic cross sectional views of a cell according to FIG. 1 with an alternative liquid crystal based substance.
Figure 2B:
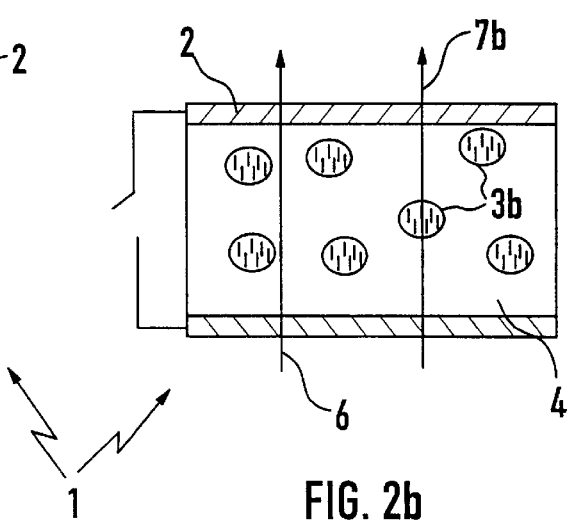

On FIGS. 2a and 2b are shown a similar cell 1 of a spatial light modulator as before but now using a nematic LC with a negative dielectric anisotropy, while the whole is in an homoetropic configuration. In this case, the LC-droplets 3b director axes are aligned parallel to the propagation axe of the light beam in the off-state i.e. in the absence of an electric field (s. FIG. 2b). Any applied voltage will make the cell 1 more or less opaque (s. FIG. 2a).

When choosing specific electrodes 2, such that the applied voltage is non-uniform in space, the electric field inside said cell 1 will have a variable spatial distribution along its plane. This is then adapted to modulate at least a pass band comprising at least a wavelength at which an optical signal is transmitted through said cell 1. The modulation will preferably chosen such that the cell acts as a variable attenuator by flattening or equalizing said pass band.

Figure 3:
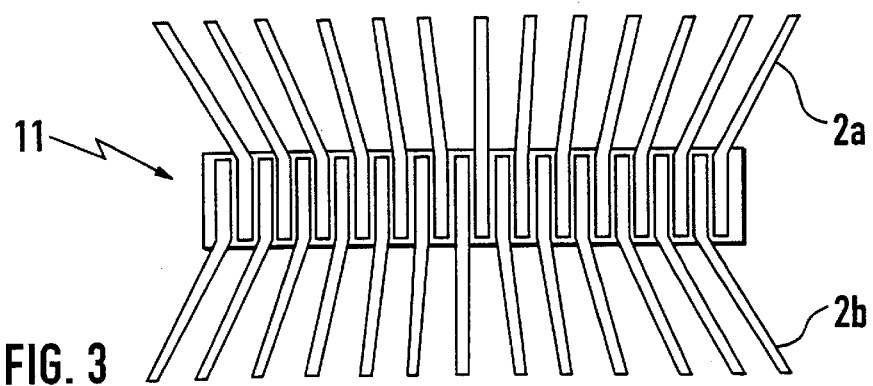
FIG. 3 is a front view of an embodiment of an electrode of the cell according to the present invention.

As a principal aim of the present invention is to modulate in a single step a high number of different pass bands comprising each at least a different respective wavelength at which optical signals are transmitted (WDM-technique) using a single SLM, at least one electrode 2 is then divided into a plurality of parallel electrodes 2a, 2b as shown in a front view on FIG. 3. If each of these electrodes 2a, 2b are controlled separately, it is then possible to apply on the PDLC a variable spatial distribution adapted to modulate a continuous spectrum. Latter may contain a high number of different pass bands, while at least few of them comprise at least a respective wavelength at which optical signals are transmitted through said cell 1. It is important that each pass band comprising a different wavelength which will be modulated are to be transmitted through the cell 1 at a different corresponding region along the plane.

On FIG. 4 is visualized an example of an electric field distribution inside the cell 1. Ox is the modulation and dispersion axis i.e. the plurality of electrodes 2a, 2b are parallel to oy. And oz is the propagation axis of the light beam transmitted through such cell 1. As shown here on FIG. 4, such distribution of the electric field will be adapted to modulate a continuous spectrum made of a number of different pass bands.

It is essential in the context of the present invention to ensure that the different wavelengths present in the incident light beam will be spread onto different regions of said SLM. For that, a dynamic spectral equalizer using such kind of SLM will further comprise a spectral dispersive element placed on an optical path of the incident light. This dispersive element in free-space can be a prism, a volume hologram, a grating or a combination of them. They provide an angular dispersion which is converted into a spatial multiplex (lateral shift as a function of the wavelength $\lambda$). It is of advantage also to ensure that the direction of propagation of each different wavelength when reaching said SLM are almost perpendicular to it. In that way, the used SLM will be almost polarization independent. Furthermore, it is preferable that the focus or image of each different wavelength on said SLM is adapted to give rise to a spot size of at least several times bigger than the average size of the LC droplets filling its cell 1. All these conditions will permit to optimize the modulation of the incident light beam (shaping of the transmission loss).

Figure 5:
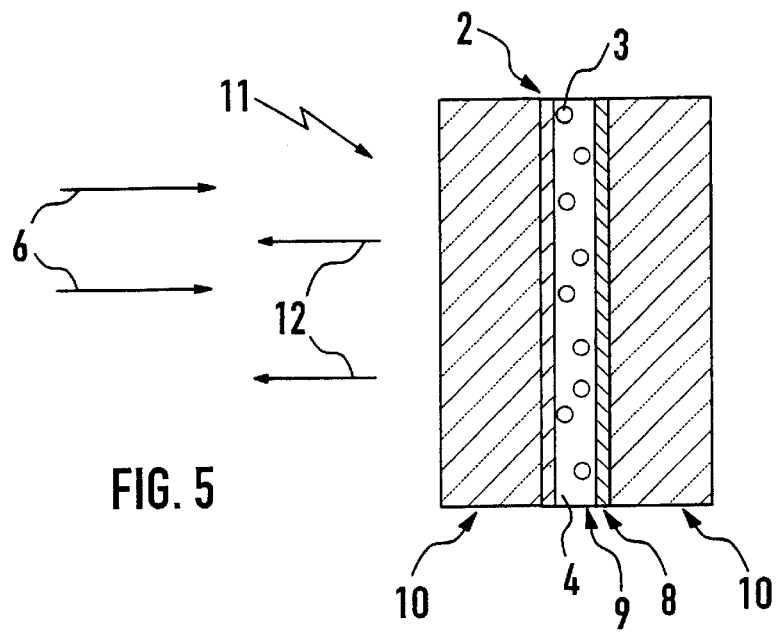
FIG. 5 is a cross sectional view of a cell from a spatial light modulator used in reflection mode according to the present invention.

To optimize the size and not least the cost of such dynamic spectral equalizer, a planar reflecting SLM will be used. On FIG. 5 is shown a cross sectional view of an embodiment of such planar reflecting SLM 11. It is made of two planar glass substrates 10 which are placed parallel side-to-side. Between them are two electrodes 2, 8 while in between is confined the PDLC 9. When using such planar reflecting SLM 11, an incident light beam 6 will first come through the first electrode 2 which is transparent. Latter can be made advantageously of Indium Tin Oxide (ITO). Afterwards, the incident light beam 6 will be modulated by the PDLC 9 before being reflected by the second electrode 8 made of a mirror again through the PDLC 9. The light beam reflected by said planar reflecting SLM 11 will therefore be transmitted twice through the PDLC 9.

Figure 6:
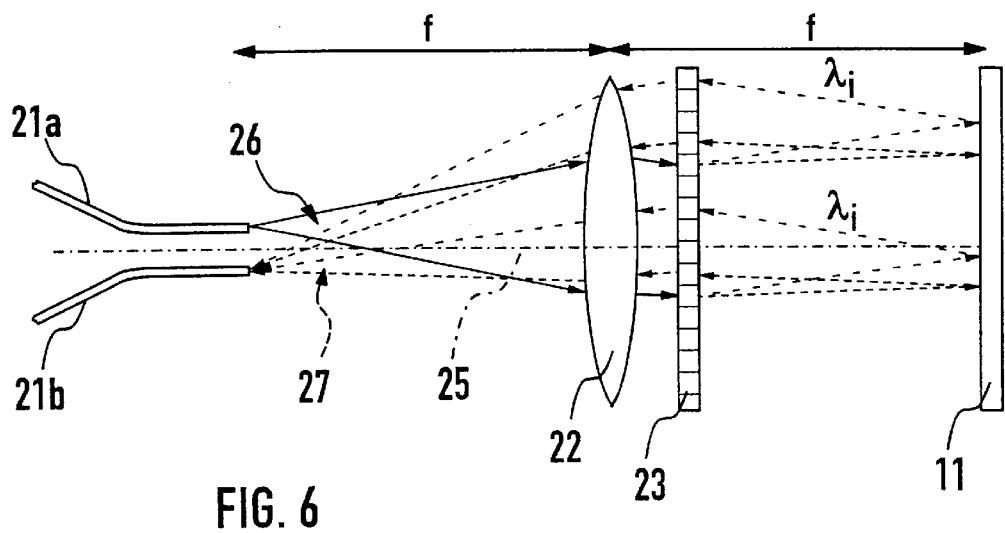
FIG. 6 is a representation of the optical diagram of a dynamic spectral equalizer in a Fourier configuration according to the present invention.
Figure 7:
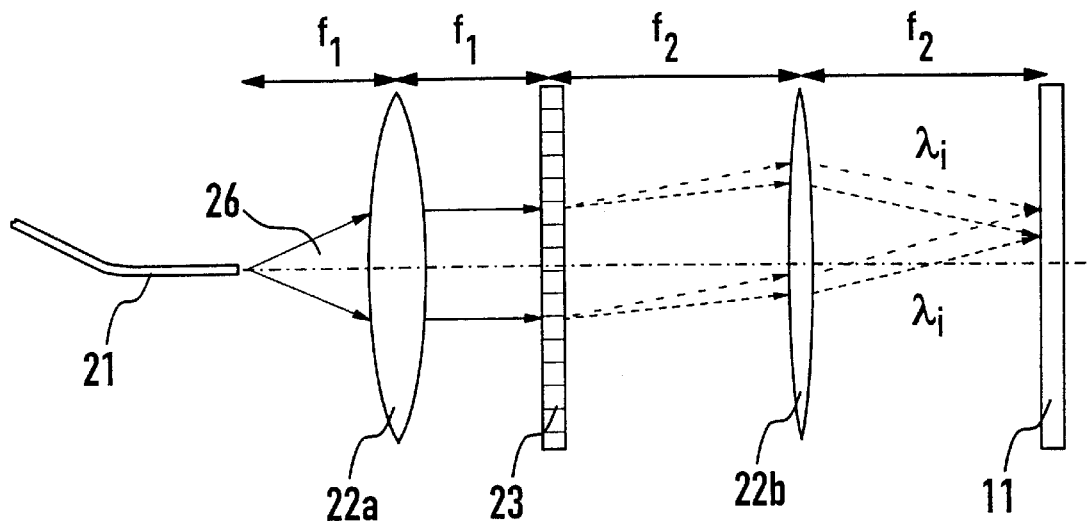
FIG. 7 is a representation of the optical diagram of a dynamic spectral equalizer in an imaging configuration according to the present invention.
Figure 8:
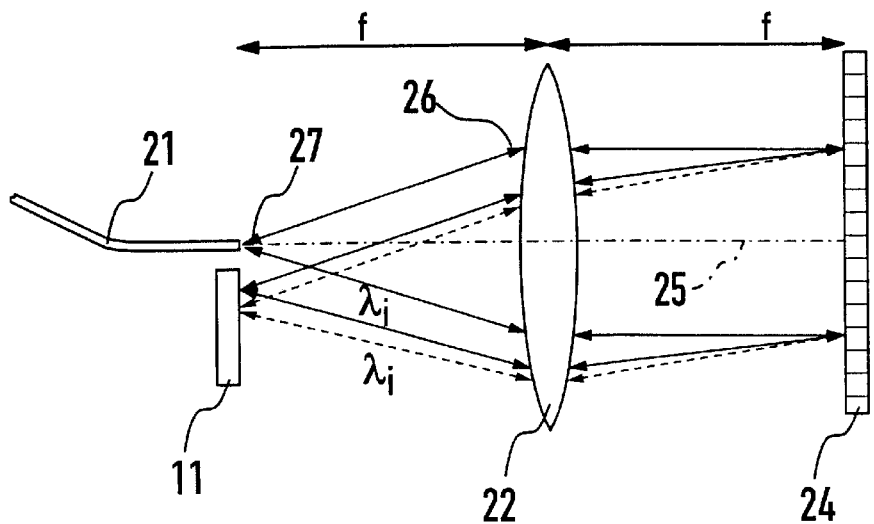
FIG. 8 is a representation of the optical diagram of a dynamic spectral equalizer in a folded imaging configuration according to the present invention.

The use of a reflecting SLM 11 according to the present invention has the big advantage to economize the number of optical elements needed for a dynamic spectral equalizer and permits therefore to optimize its compactness. On FIGS. 6 to 8 are shown different possible embodiments of such dynamic spectral equalizer. All of them comprise a grating 23, 24 as well as a similar reflecting SLM 11 but placed at a different region along an optical axis 25 of the incident light beam. The grating 23 is made of a demultiplexer (WDM dmux) which will act as a multiplexer on the reflected light beam. For efficiency a thick grating or volume hologram may be preferable. In addition, the Bragg selectivity of the such grating can be used to block parasitic PDLC back-scattering.

FIG. 6 represents a dynamic spectral equalizer in the Fourier configuration. A diverging incident light beam 26 is coming out of an input fiber 21a and reaches a lens 22 placed on an optical axis 25 parallel to the propagation direction of said light beam 26. Afterwards, it is transmitted through a grating 23 here a WDM dmux before reaching said SLM 11. Due to the lens 22 and the grating 23 two different wavelengths $\lambda_i$ and $\lambda_j$ will reach the SLM 11 at different spatial regions. The spot size is in this case equal to $\lambda f/\omega_0$ where f is the focal distance and $\omega_0$ is the waist at the origin here of the input fiber 21b. Since the SLM 11 is a reflecting one, the transmitted light beam will be recombine by the same grating 23 acting now as a multiplexer and converged by the lens 22 toward an output fiber 21b which optical axis is parallel to the one of the input fiber 21a while symetric with respect to the optical axis 25. The angular chromatism will be balanced during the back pas. It can be of advantage to use a single mode fiber with extended core for the output fiber. In such a way, the convergence conditions are not that high.

FIG. 7 represents an alternative of a dynamic spectral equalizer now in the imaging 4-f configuration. A single fiber 21 is used for the incident diverging light beam 26 as well as the converging transmitted light beam. Latter is merged with former due to the use of a single fiber 21. In this configuration two lenses 22a and 22b respectively with focal distance f1 and f2 are used and placed along the optical axis 25 on each side of the grating 23. The different wavelengths e.g. $\lambda_i$ and $\lambda_j$ will then reach the reflecting SLM 11 placed also along said optical axis 25 at different regions. After being reflected by it, the different wavelengths will be recombined by the same grating 23 and the two same lenses 22a and 22b before leaving the dynamic spectral equalizer through the same fiber 21.

On FIG. 8 is represented a dynamic spectral equalizer also in the imaging configuration but now as folded 4-f. Similar to the case shown in FIG. 7, a single fiber 21 is used both for the incident diverging light beam 26 as well as the converging transmitted light beam 27. But now a single lens 22 will be sufficient in combination of a reflecting grating 24 both placed along the optical axis 25. The reflecting SLM is now close to the fiber 21 with its plane still perpendicular to the optical axis 25. In such a way, the reflecting SLM 11 is facing the lens 22 in a same way as the diverging light beam 26 along slightly shifted with respect to the fiber 21. In comparison to the case before (FIG. 7) a clear gain in compactness is achieved.

In both imaging configuration shown on FIGS. 7 and 8, the spot size will be equal to $G\omega_0$ where G is an adjustable magnification factor equal to the focal distance ratio. Typical values for all three configurations (FIGS. 6–8) for $\Delta\lambda$ of about 0.8 nm (distance between two different wavelengths at which optical signals in WDM are transmitted) are for the spot size about 10 $\mu$m and focal distances of about 5 cm.

The use of a SLM according to the present invention (a reflecting or not) requires a sufficient dispersive power to allow a good wavelength discrimination specially when the different wavelengths at which optical signals are transmitted in WDM technique are very close each other. Furthermore, a sufficient spot size must be ensured to take enough advantage of the scattering effect. And the incidence of the light beam on the used SLM must be normal (or almost normal) to its plane such to avoid any polarization dependence. All these conditions are perfectly guaranteed by the use of a dynamic spectral equalizer according to the present invention.

A telecommunications device according to the present invention incorporating such dynamic spectral equalizer will advantageously be used when transmission of telecommunications signals is managed in a WDM technique. The dynamic spectral equalizer will have to be inserted before e.g. an amplifier. Latter will then be able to work on the different wavelengths at which optical signals are sent in an optimized way.

What is claimed is:

1. A spatial light modulator comprising:
   a planar cell, said planar cell including:
      a liquid crystal based substance having a variable scattering property with respect to an electric field,
      at least two electrodes enclosing said planar cell from each side of its plane, at least on one side of said plane said electrode is divided into a plurality of adjacent electrodes configured to be controlled separately,
      said two electrodes configured to apply a voltage, on said liquid crystal, said applied voltage being non-uniform in space implying an electric field inside said cell with a variable spatial distribution along said plane,
      said cell having a variable spatial distribution configured to modulate at least a pass band comprising at least a wavelength at which an optical signal is transmitted through said cell, while said modulation taking the form of a variable attenuation.

2. The spatial light modulator according to claim 1, wherein said variable spatial distribution is adapted for the modulation of at least two different pass bands comprising each at least a respective wavelength at which optical signals are transmitted through said cell respectively at two different regions along said plane.

3. The spatial light modulator according to claim 1, wherein at least on one side of said plane said electrode is divided into a plurality of adjacent electrodes giving rise to said variable spatial distribution adapted to modulate a continuous spectrum containing a number of different pass bands, while at least few of them comprise at least a respective wavelength at which optical signals are transmitted through said cell at a different region along said plane for each of these respective different wavelengths.

4. The spatial light modulator according to claim 1, wherein said plurality of adjacent electrodes are controlled independently with a variable voltage allowing to adapt said spatial light modulator to a change of optical properties of said incident light beam.

5. The spatial light modulator according to claim 2, wherein said modulation acts as a variable attenuator by flattening or equalizing said pass band comprising at least said respective wavelength.

6. The spatial light modulator according to claim 1, wherein said electrode being at the rear of said cell with respect to incident optical signals comprises a reflective plane for said incident optical signals.

7. The spatial light modulator according to claim 1, wherein said liquid crystal based substance filling said cell is made of a suspension of liquid crystal droplets of nematic or possibly chiral form, in a host medium of a polymer.

8. The spatial light modulator according to claim 2, wherein said droplets are of an average size comparable or smaller than said wavelength at which an optical signal is transmitted through said cell such that said droplets act as light scatters when their liquid crystal director axes are not aligned with the propagation axis of said light.

9. A dynamic spectral equalizer comprising:
   an optical input for an incident light beam consisting of optical signals transmitted via at least a wavelength,
   an optical output for collecting a resulting light beam, said dynamic spectral equalizer comprising further a spatial light modulator on which said incident light beam is focused or imaged and out of which said resulting light beam is collected, said spatial equalizer including:
      a planar cell filled with a liquid crystal based substance having a variable scattering property with respect to an electric field, and
      at least two electrodes enclosing said planar cell from each side of its plane, wherein at least on one side of said plane said electrode is divided into a plurality of adjacent electrodes configured to be controlled separately,
      said two electrodes configured to apply a voltage on said liquid crystal, said applied voltage being non-uniform in space implying an electric field inside said cell with a variable spatial distribution along said plane,
      said cell with variable spatial distribution configure to modulate at least a pass band comprising at least a wavelength at which an optical signal is transmitted through said cell, while said modulation taking the form of a variable attenuation.

10. The dynamic spectral equalizer according to claim 9, wherein it comprises further a spectral dispersive element on an optical path of said incident light beam such that said spectral dispersive element spread continuously said incident light beam onto said spatial light modulator such that at least each different wavelength present in said incident light beam are focused or imaged towards a different spatial region of said spatial light modulator.

11. The dynamic spectral equalizer according to claim 10, wherein the direction of propagation of each different wavelength when reaching said spatial light modulator are almost perpendicular to it such that said modulator is almost polarization independent.

12. The dynamic spectral equalizer according to claim 10, wherein the focus or image of each different wavelength when reaching said spatial light modulator is adapted to give rise of a spot size of at least several times bigger than the average size of the liquid crystal droplets according to claim 8 such that said spatial light modulator is almost polarization independent.

13. The dynamic spectral equalizer according to claim 9, wherein said spatial light modulator is used in reflection mode such that said incident light beam will be transmitted through said cell twice before being collected as said resulting light beam.

14. The dynamic spectral equalizer according to claim 9, wherein said optical input and output are given by at least an optical fiber.

15. A telecommunications device comprising:
   a dynamic spectral equalizer, said dynamic spectral equalizer including:
      an optical input for an incident light beam consisting of optical signals transmitted via at least a wavelength,
      an optical output for collecting a resulting light beam, said dynamic spectral equalizer comprising further a spatial light modulator on which said incident light beam is focused or imaged and out of which said resulting light beam is collected, said spatial light modulator having;

a planar cell, said planar cell including:
  a liquid crystal based substance having a variable scattering Property with respect to an electric field,
  at least two electrodes enclosing said planar cell from each side of its plane, at least on one side of said plane said electrode is divided into a plurality of adjacent electrodes configured to be controlled separately,
  said two electrodes configured to apply a voltage, on said liquid crystal, said applied voltage being non-uniform in space implying an electric field inside said cell with a variable spatial distribution along said plane,
  said cell having a variable spatial distribution configured to modulate at least a pass band comprising at least a wavelength at which an optical signal is transmitted through said cell, while said modulation taking the form of a variable attenuation.

* * * * *